United States Patent [19]

Ho et al.

[11] Patent Number: 5,739,821
[45] Date of Patent: Apr. 14, 1998

[54] METHOD FOR POINTING A WINDOW FRAME OR AN ICON OF A WINDOW INTERFACE

[75] Inventors: Heng Chun Ho; Ming Cheng Yang; Wen Hsiung Liu; Chih Hsiung Wu, all of Taipei Hsien, Taiwan

[73] Assignee: Primax Electronics Ltd., Taipei Hsien, Taiwan

[21] Appl. No.: 791,276

[22] Filed: Jan. 30, 1997

[51] Int. Cl.[6] ............................................ G06F 3/00
[52] U.S. Cl. ...................... 345/340; 345/145; 345/341
[58] Field of Search ............................ 345/340, 341, 345/342, 348, 357, 358, 119, 123, 145

[56] References Cited

U.S. PATENT DOCUMENTS

| | | | |
|---|---|---|---|
| 5,196,838 | 3/1993 | Meier et al. | 345/341 |
| 5,548,702 | 8/1996 | Li et al. | 345/346 |
| 5,625,782 | 4/1997 | Soutome et al. | 345/341 |
| 5,655,093 | 8/1997 | Frid-Nielsen | 345/326 |

*Primary Examiner*—Raymond J. Bayerl
*Assistant Examiner*—Cao H. Nguyen
*Attorney, Agent, or Firm*—The Kline Law Firm

[57] ABSTRACT

A window frame pointing method is used for pointing a window frame out of multiple window frames contained within a window interface by using a mouse. The content of the window interface will automatically be scrolled if the pointed window frame is not displayed over a monitor screen. The mouse comprises a two dimensional control button for generating a two dimensional pointing signal. The window interface is controlled by a window software which comprises a frame control module for controlling the pointing of a window frame according to the pointing signal. The method comprises: providing a frame position file which contains position of each window frame contained within the window interface, actuating the control button to generate a pointing signal, detecting a position of a window frame contained in the frame position file starting from the position of a currently pointed window frame approximately along the direction of the pointing signal, and designating and displaying the detected window frame as a pointed window frame over the monitor screen.

20 Claims, 8 Drawing Sheets

METHOD FOR POINTING A WINDOW FRAME OR AN ICON OF A WINDOW INTERFACE

BACKGROUND OF THE INVENTION

1. Field of the Invention

The present invention relates to a method for controlling a window interface, and more particularly, to a method which uses a computer mouse to point a window frame or an icon contained in a window interface.

2. Description of the Prior Art

Window-based application interface has been commonly accepted by computer users in today's office environment. Within a window interface, an executable program is usually presented as a program icon. The program can be executed by moving a cursor to the program icon first and then clicking a specific button of a computer mouse. Multiple program icons are usually grouped in a window frame which works just like a file folder for holding various paper files. And all the window frames are positioned within the window interface. Each window frame can be opened or closed by using the mouse. When a window frame is closed, it will be changed to a frame icon representing the closed window frame. The frame icon can be pointed and opened by using the cursor and the mouse.

Several problems are found in the traditional window interface. First, in some cases only some of the window frames are displayed over the monitor screen, and one or two scrolling bars are provided by the window interface for scrolling the content of the monitor screen so that those embedded window frames can be seen and accessed by a user. Scrolling the window interface by using the scrolling bars to locate a window frame is very inconvenient and also not an effective method to a user.

Second, window frames can be randomly moved and positioned in any part of the window interface. Sometimes a window frame may be fully covered by other window frames. In this case the covered window frame is not accessible unless some of the overlapped window frames are shifted or closed. This is also very inconvenient. Besides, shifting a window frame will permanently change its location in the window interface. Resuming a closed window frame is sometimes not an easy job. The frame icon of the closed window frame is very small and its location is usually not the same as its opened window frame. A user must locate the frame icon first in order to open it. If the frame icon is unfortunately covered by another window frame or embedded in the window interface, a lot of efforts will be taken to locate it. This again is very tedious and time consuming.

Third, for those program icons contained within an window frame, in some cases only part of the program icons are displayed over the monitor screen, and one or two scrolling bars are provided over the right or bottom sides of the window frame for scrolling the content of the window frame so that those embedded program icons can be displayed and accessed by a user. Scrolling a window frame by using the scrolling bars to locate a program icon is also very inconvenient and also not an effective method for a user.

The above mentioned problems are frequently met when using a window interface. If such problems can be solved, efficiency in controlling a window interface will be greatly improved.

SUMMARY OF THE INVENTION

It is therefore a primary objective of the present invention to provide a window frame pointing method which allows a user to easily locate and access a target window frame contained within a window interface so that the user does not need to scroll the window interface by using scrolling bars, or to shift or close other window frames overlapped above the target window frame.

It is another objective of the present invention to provide a method to manage frame icons of all the closed window frames so that a user can easily locate and access any of the frame icons.

It is still another objective of the present invention to provide a method to locate a target program icon contained within a window frame to make it accessible to a user so that the user does not need to scroll the content of the window frame to locate the target program icon by using its scrolling bars.

Briefly, in a preferred embodiment, the present invention includes a method for pointing a window frame out of a plurality of window frames contained within a window interface by using a pointing device. The window interface is displayed over a monitor screen of a monitor. One of the window frames is designated as a pointed window frame which is displayed over the monitor screen in a predetermined manner, and the other window frames displayed over the monitor screen are displayed in a normal manner. The pointing device comprises a two dimensional control button for generating a two dimensional pointing signal and a cursor control means for generating cursor control signals to scroll a cursor displayed over the monitor screen according to user inputs. The pointing device is connected to a computer which is connected to the monitor and which comprises a window software for controlling the window frames and the cursor. The window software comprises a frame control module for controlling the pointing of a window frame according to the pointing signal and a cursor control module for controlling the scrolling of the cursor over the monitor screen according to the cursor control signals. The method comprises:

(1) providing a position frame file which contains positions representing the window frames contained within the window interface;

(2) actuating the control button toward a direction by a user to generate a pointing signal;

(3) receiving the pointing signal by using the frame control module;

(4) detecting a position of a window frame contained in the frame position file starting from the position of the pointed window frame approximately along the direction of the pointing signal; and (5) designating and displaying the detected window frame as a pointed window frame over the monitor screen and changing the display of the last pointed window frame to the normal manner.

Some of the window frames contained in the window interface are displayed over the monitor screen. If the detected window frame is not displayed over the monitor screen, the frame control module will scroll the content of the monitor screen first to display the detected window frame in the monitor screen.

Each of the window frame can further be closed or opened by using the pointing device. The pointing device comprises a bi-directional button having a first end for generating an open signal by clicking it to open the pointed window frame, and a second end for generating a close signal by clicking it to close the pointed window frame. The frame position file contains positions of all the opened window frames, and the window software further comprises a background file for keeping all the closed window frames. When an opened window frame is closed by using the pointing device, the window frame is removed from the window interface and information about the closed window frame is recorded in the background file by the frame control module. And when a closed window frame contained in the background file is opened by using the pointing device, the window frame is moved into the window interface by the frame control module.

The first end of the bi-directional button can also be pressed to generate a shift-in signal and the second end of the bi-directional button can be pressed to generate a shift-out signal. Upon receiving the shift-in signal when one of the window frames is being pointed, the frame control module opens a background frame over the monitor screen which contains frame icons representing the closed window frames stored in the background file, and the frame control module closes the background frame upon receiving the shift-out signal.

Each of the window frames contains a plurality of program icons and each program icon represents an executable program stored in the computer. Upon receiving the shift-out signal when a window frame is being pointed, the frame control module designates and displays one of the program icons contained within the pointed window frame as a pointed icon. And upon receiving the shift-in signal when one of the program icons is being pointed, the frame control module designates and displays the window frame of the last pointed program icon as a pointed window frame.

The present invention further includes a method for pointing a program icon out of a plurality of program icons contained within the pointed window frame by using a pointing device. The method comprises:

(1) providing an icon position file which contains positions representing the program icons contained within the window frame;

(2) actuating the control button toward a direction by a user to generate a pointing signal;

(3) receiving the pointing signal by using the frame control module;

(4) detecting a position of a program icon contained in the icon position file starting from the position of the pointed icon approximately along the direction of the pointing signal; and (5) designating and displaying the detected program icon as a pointed icon over the monitor screen.

Part of the program icons contained in the window frame are displayed over the monitor screen and if the detected program icon is not displayed over the monitor screen, the frame control module will scroll the content of the window frame first to display the detected program icon in the monitor screen.

It is an advantage of the present invention that it provides a window frame pointing method for locating a target window frame contained within a window interface which is very easy to use and a user does not need to scroll the window interface by using its scrolling bars, or to shift or close other window frames overlapped above the target window frame.

It is another advantage of the present invention that it provides a background file and a background frame to manage the frame icons of all the closed window frames so that a user can easily locate and access any of the frame icons of the closed window frames.

It is still another advantage of the present invention that it provides a program icon pointing method for pointing a program icon contained within a window frame to make it accessible to a user so that the user does not need to scroll the window frame by using its scrolling bars.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
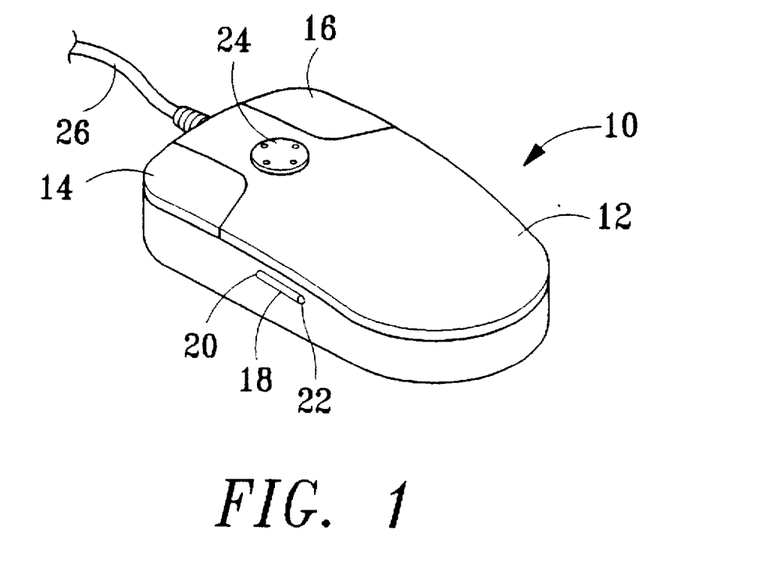
FIG. 1 is a perspective view of a computer mouse according to the present invention.

Please refer to FIG. 1. FIG. 1 is a perspective view of a computer mouse 10 according to the present invention. The mouse 10 comprises a housing 12, a left button 14 and a right button 16, a bi-directional button 18 which is depressible over its front end 20 and its rear end 22, a two dimensional control button 24 which is depressible toward various directions (two dimensions) by using a finger, a roller ball (not shown) installed on the bottom end of the housing 12, and a flexible cable 26 for connecting the mouse 10 to a computer.

Figure 2:
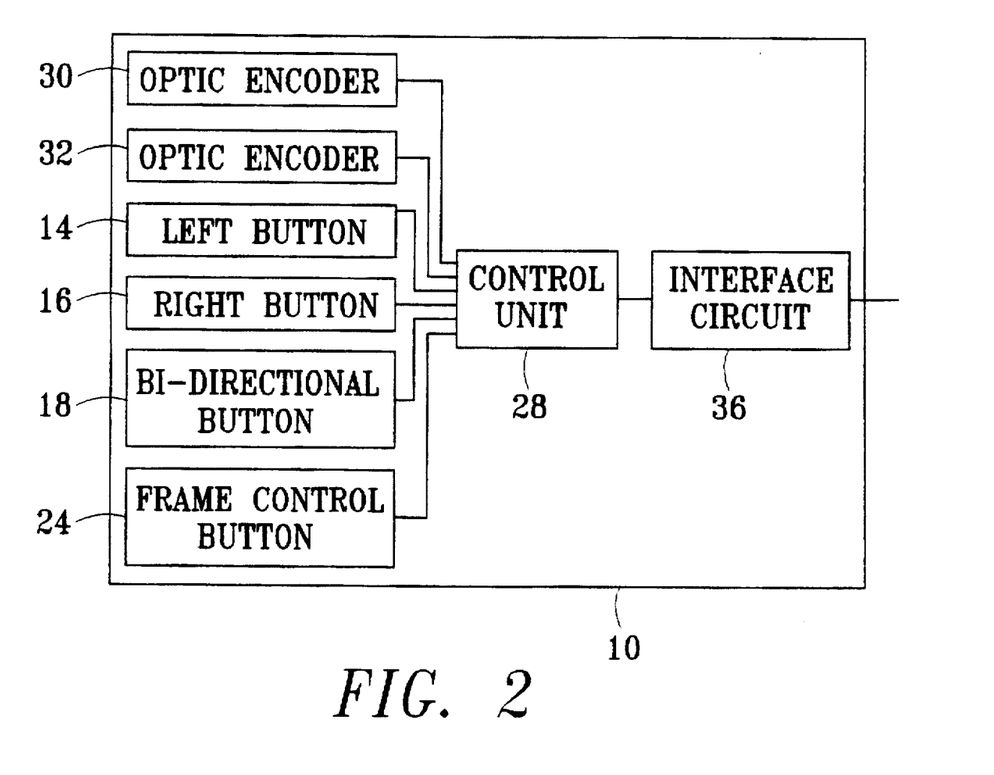
FIG. 2 is a block diagram of the computer mouse shown in FIG. 1.

FIG. 2 is a block diagram of the mouse 10 shown in FIG. 1. The mouse 10 comprises a control unit 28 connected to various input units for constantly polling these input units and generating digital input signals accordingly, and an interface-circuit 36 connected to the control unit 28 for transmitting the digital input signals to a computer and receiving digital control commands from the computer. The input units of the mouse 10 comprises a left button 14, a right button 16, a bi-directional button 18, a control button 24 and two optic encoders 30,32 for converting rotations of the roller ball installed on the bottom end of the mouse 10 into digital input signals.

Figure 3:
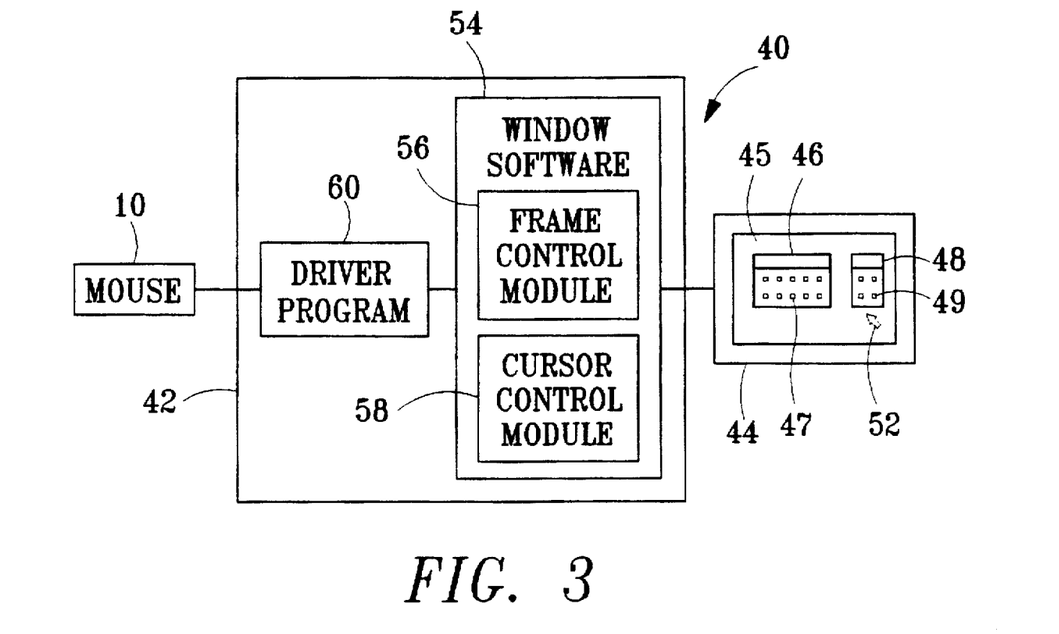
FIG. 3 shows a block diagram of a computer system according to the present invention.

FIG. 3 shows a block diagram of a computer system 40 according to the present invention. The computer system 40 comprises a computer 42, a monitor 44 and a mouse 10. The computer system 40 is used to control the pointing of window frames 46 and 48 displayed over the monitor screen 45 of the monitor 44, or the pointing of program icons 47 or 49 displayed inside the window frames 46 and 48. The computer 42 comprises a driver program 60 and a window software 54. The driver program 60 is used for receiving digital input signals from the mouse 10 and transmitting the signals to the window software 54. And the window software 54 is used for controlling the display of the cursor 52 and the window frames 46 and 48. Each of the window frames 46 and 48 contains a plurality of program icons 47 and 49 and each of the program icons represents an executable program stored in the computer 42. The window software 54 comprises two software modules: frame control module 56 and cursor control module 58.

The frame control module 56 is used to control the pointing of a window frame displayed over the monitor screen 45 according to pointing signals generated by the control button 24 of the mouse 10. The cursor control module 58 is used for controlling the scrolling of the cursor 52 over the monitor screen 45 according to signals generated from the two optic encoders 30 and 32 of the mouse 10. The two optic encoders 30 and 32 are used as a cursor control means for generating cursor control signals to control the scrolling of the cursor 52 through the cursor control module 58.

Figure 4:
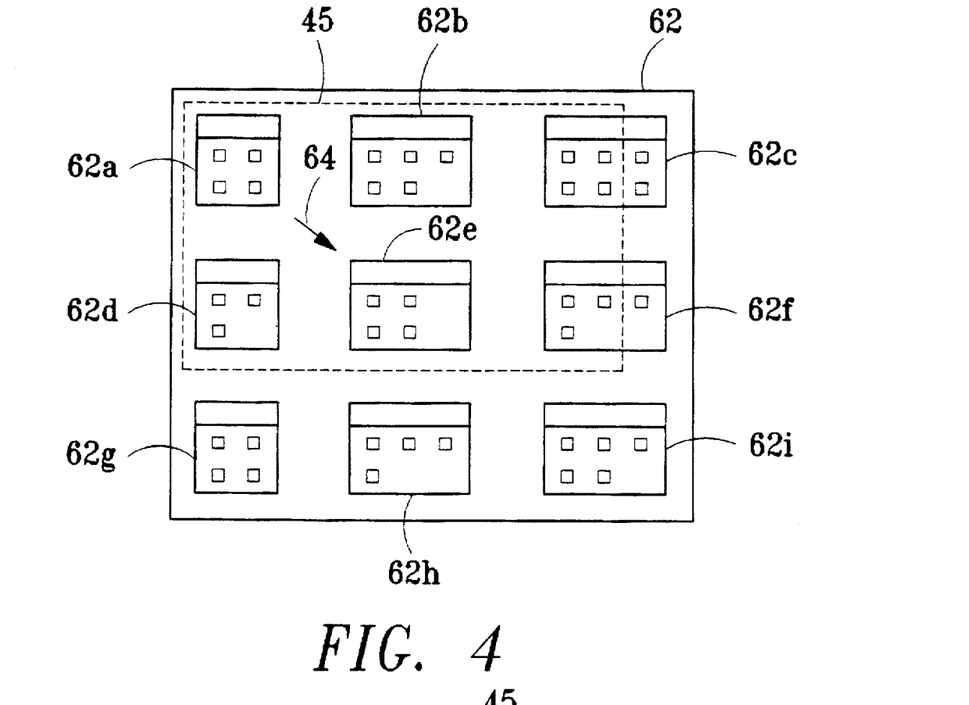
FIGS. 4 to 6 show scrolling of a window interface containing nine window frames in it over the monitor screen.
Figure 5:
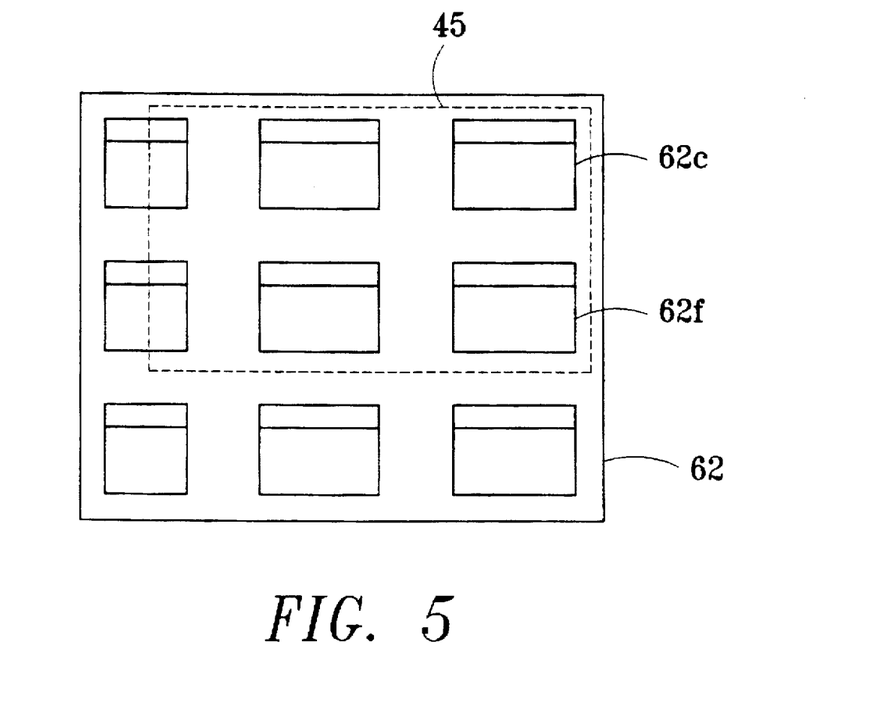
Figure 6:
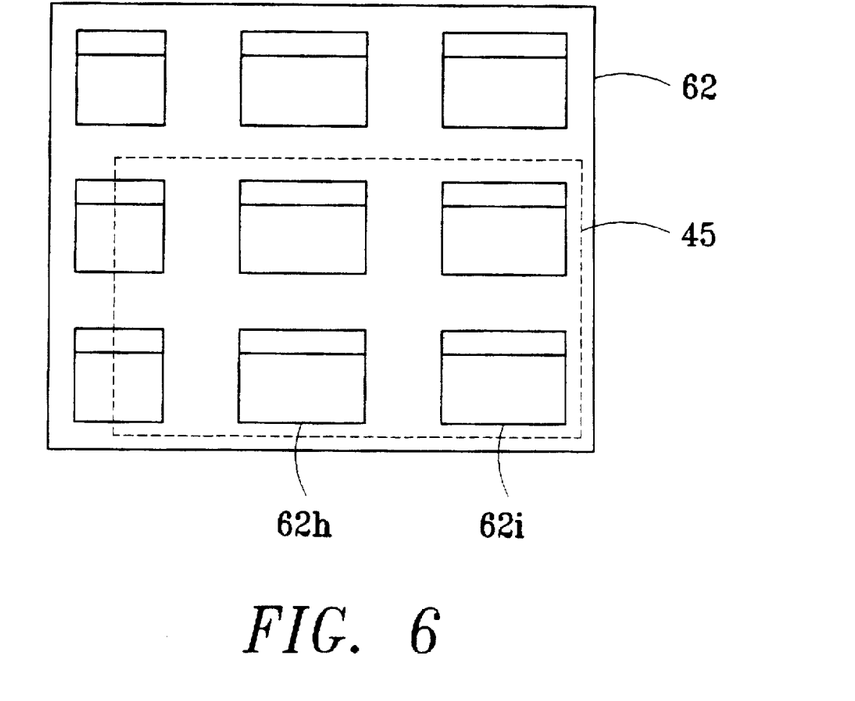

Please refer to FIGS. 4 to 6. FIGS. 4 to 6 show scrolling of a window interface 62 containing nine window frames 62a–62i in it over the monitor screen 45. The window interface 62 is represented by a two dimensional rectangular area and each of the window frames 62a–62i is positioned within the rectangular area of the window interface 62. The positions of all the window frames 62a–62i within the window interface 62 are stored in a frame position file (not shown) of the window software 54. Each window frame is in a rectangular shape and the position of each window frame is defined as the center of each window frame so that only one position is needed for each window frame in the frame position file. The position of each window frame can also be defined in other manner as long as the relative position of each window frame to other window frames or the relative position of each window frame within the window interface 62 can approximately be maintained.

In FIG. 4, six window frames (frames 62a–62f) contained in the window interface 62 are displayed over the monitor screen 45, and three window frames (frames 62g–62i) are not displayed in the monitor screen 45 which are called embedded window frames. Within the six displayed window frames, two window frames (frames 62c and 62f) are partially displayed over the monitor screen 45.

Frame 62a is designated as a pointed window frame when the window interface 62 is displayed over the monitor screen 45. The upper end of the window frame 62a is highlighted to signify the pointed status and all the other window frames are displayed in a normal manner. If another window frame is pointed later on, the upper end of the newly pointed window frame will be highlighted and the upper end of the last pointed window frame will be displayed in a normal manner. In the preferred embodiment of this invention, only one window frame is pointed at any moment.

The way to select and point a new window frame is very simple. The center of each window frame in this preferred embodiment is defined as its position within the two dimensional rectangular area of the window interface 62. When a user actuates the control button 24 of the mouse 10 toward a direction to generate a pointing signal, such as the direction shown by the pointer 64, the frame control module 56 will receive the pointing signal and detect a position of a window frame contained in the frame position file starting from the position of the currently pointed window frame 62a approximately along the direction 64 of the pointing signal. And when a window frame is detected, such as the window frame 62e, the frame control module 56 will designate and display the detected window frame 62e as a pointed window frame over the monitor screen 45 and also change the display of the last pointed window frame 62a to a normal manner to signify that it is no longer being pointed.

If a detected window frame is not displayed over the monitor screen 45 such as the frames 62g–62i, or is partially displayed over the monitor screen 45 such as the frames 62c and 62f, the frame control module 56 will scroll the content of the monitor screen 45 first so that the detected window frame can be completely displayed over the monitor screen 45. In FIG. 4, when one of the partially displayed window frames 62c and 62f is pointed, the window interface 62 will be scrolled first over the monitor screen 45 so that those partially displayed window frames 62c and 62f can be completely displayed and pointed. FIG. 5 shows the result of such scrolling. In FIG. 5, when one of the embedded window frames 62h–62i is pointed, the window interface 62 will also be scrolled over the monitor screen 45 so that these embedded window frames can be completely displayed and pointed. FIG. 6 shows the result of such scrolling.

Each of the window frames 62a–62i can further be closed or opened by using the bi-directional button 18 of the mouse 10. When an opened window frame is being pointed, the rear end 22 of the bi-directional button 18 can be clicked to generate a close signal to close the pointed window frame, and the front end 20 of the bi-directional button 18 can also be clicked to generate an open signal to open a closed window frame.

In the preferred embodiment, all the window frames contained in the window interface 62 are opened window frames, and the frame position file of the window software 54 is used for keeping positions of all the opened window frames. The window software 54 further comprises a background file (not shown) for keeping information about all the closed window frames. When an opened window frame displayed over the window interface 62 is closed by using the mouse 10, the image of the window frame is removed from the window interface 62 and information about the closed window frame is recorded in the background file by the frame control module 56.

The bi-directional button 18 of the mouse 10 can also be used to generate a shift-in signal by simply pressing the front end 20 of the button 18, and a shift-out signal by pressing the rear end 22 of the button 18 for controlling the frame control module 56. The frame control module 56, upon receiving the shift-in signal when one of the window frames is being pointed, opens a background frame 70 shown in FIG. 7 over the monitor screen 45 which contains frame icons 72 representing all the closed window frames recorded in the background file. And the frame control module 56 closes the background frame 70 upon receiving the shift-out signal. When the background frame 70 is opened, one of the frame icons 72 will be automatically designated by the frame control module 56 as the pointed frame icon and the last pointed window frame displayed over the monitor screen 45 is no longer being pointed. For illustration purpose, the opened window frames 62c–62i in FIG. 4 are all closed and only two window frames 62a and 62b remain opened in FIG. 7. All these closed window frames are depicted as the frame icons 72 in the background frame 70.

Figure 7:
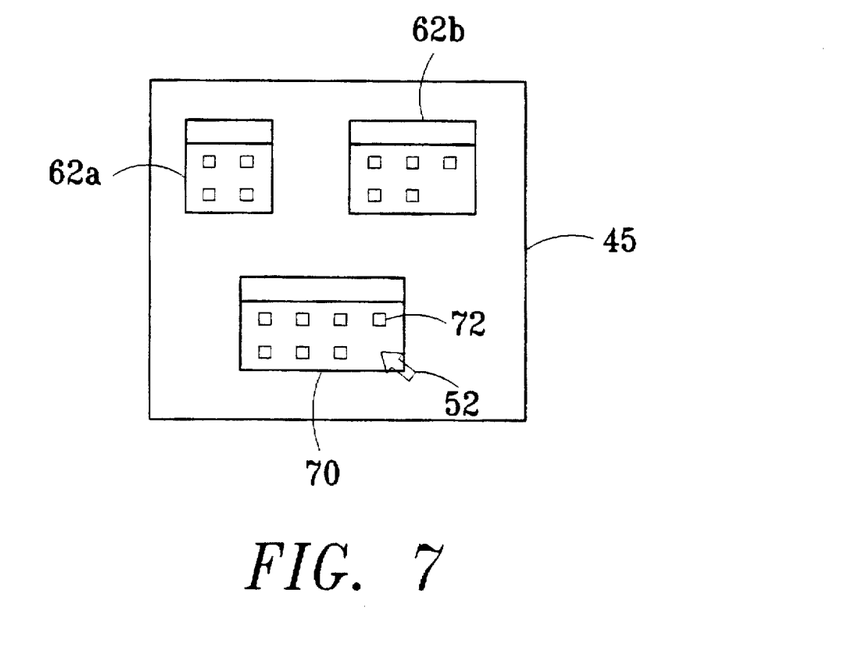
FIG. 7 shows a background frame opened by pressing the front end of the bi-directional button.

Please refer to FIG. 7. FIG. 7 shows a background frame 70 opened by pressing the front end 20 of the bi-directional button 18. The background frame 70 contains seven frame icons 72 representing the seven closed window frames 62c–62i stored in the background file. Each of the closed window frames can be opened once it is being pointed. A user can click the front end 20 of the bi-directional button 18 to generate an open signal to open the pointed closed window frame and the frame control module 56 will automatically locate a position in the window interface 62 displayed over the monitor screen 45 and open it there. A user can also drag a frame icon by using the cursor 52 and the left button 14 of the mouse 10 to a target position over the monitor screen 45. And the frame control module 56 will automatically open the dragged frame icon over the target position once it is released by the user. After a frame icon is opened, a user can press the rear end 22 of the bi-directional button 18 to generate a shift-out signal to close the background frame 70. At this moment, the last opened or pointed window frame will be designated and displayed as the pointed window frame.

When an opened window frame displayed over the monitor screen 45 is being pointed, a user can also point the program icons contained with the pointed window frame by using the bi-directional button 18 and the control button 24. The frame control module 56, upon receiving the shift-out signal generated by pressing the rear end 22 of the bi-directional button 18 when one of the window frames is being pointed, designates and displays one of the program icons of the last pointed window frame as a pointed icon. And upon receiving the shift-in signal generated by pressing the front end 20 of the bi-directional button 18 when one of the program icons is being pointed, the frame control module 56 designates and displays the window frame of the last pointed icon as a pointed window frame.

Figure 8:
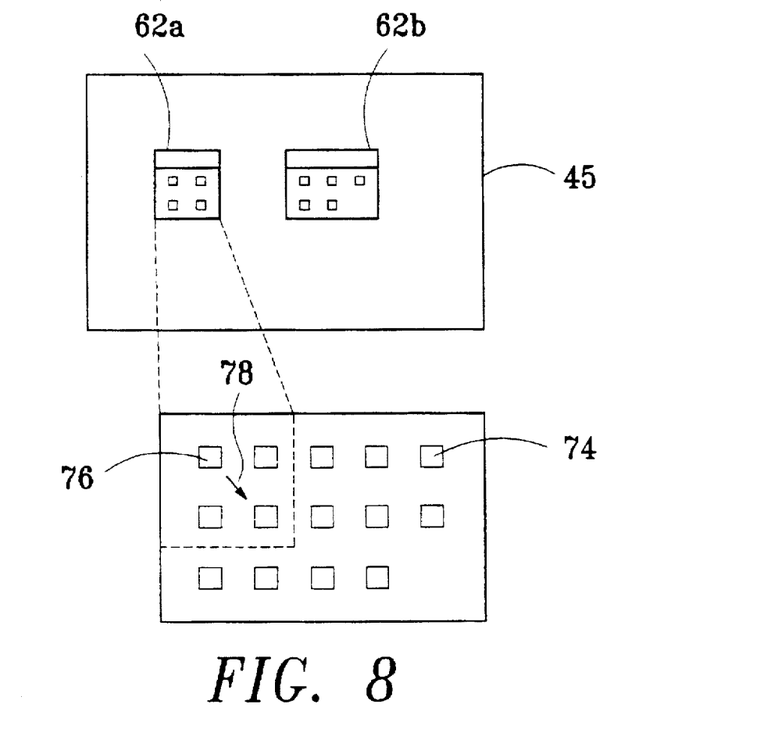
FIG. 8 shows two window frames displayed over the monitor screen and the program icons contained within the window frame.

Please refer to FIG. 8. FIG. 8 shows two window frames 62a and 62b displayed over the monitor screen 45 and the program icons 74 contained within the window frame 62a. The highlighted program icon 76 is the pointed program icon. In the preferred embodiment of the present invention, only one pointed object, such as pointed icon or pointed window frame, is allowed at any moment so that the pointing of the icon or window frame can be switched by using the bi-directional button 18 and the control button 24.

The pointing of a program icon is also controlled by the frame control module 56 according to the pointing signal generated by the control button 24 of the mouse 10. The positions of all the program icons 74 within the window frame 62a are stored in an icon position file (not shown) of the window software 54 by the frame control module 56. Each program icon is approximately in a rectangular shape and the center of each program icon is defined as its position so that only one position is needed for each program icon in the icon position file. Some of the program icons of the window frame 62a are displayed over the monitor screen 45 and the others are embedded within the window frame 62a.

Icon 76 is highlighted and designated as a pointed icon, and all the other program icons 74 are displayed in a normal manner. If another program icon is pointed later on by using the control button 24 of the mouse 10, the newly pointed program icon will be highlighted and the last pointed program icon will be displayed in a normal manner. In the preferred embodiment of this invention, only one program icon within the window interface 62 is being pointed at any moment.

The way to select and point a new program icon is very simple. The center of each program icon in this preferred embodiment is defined as its position within the two dimensional rectangular area of the window frame 62a. When a user actuates the control button 24 of the mouse 10 toward a direction to generate a pointing signal, such as the direction shown by the pointer 78, the frame control module 56 will receive the pointing signal and detect a position of a program icon contained in the icon position file starting from the position of the currently pointed program icon 76 approximately along the direction 78 of the pointing signal. And when a program icon is detected, the frame control module 56 will designate and display the detected program icon as a pointed program icon over the monitor screen 45 and also change the display of the last pointed program icon 76 to a normal manner to signify that it is no longer being pointed. If a detected program icon is embedded in the window frame 62a, the frame control module 56 will scroll the content of the window frame 62a first so that the detected program icon can be completely displayed over the monitor screen 45.

Figure 9:
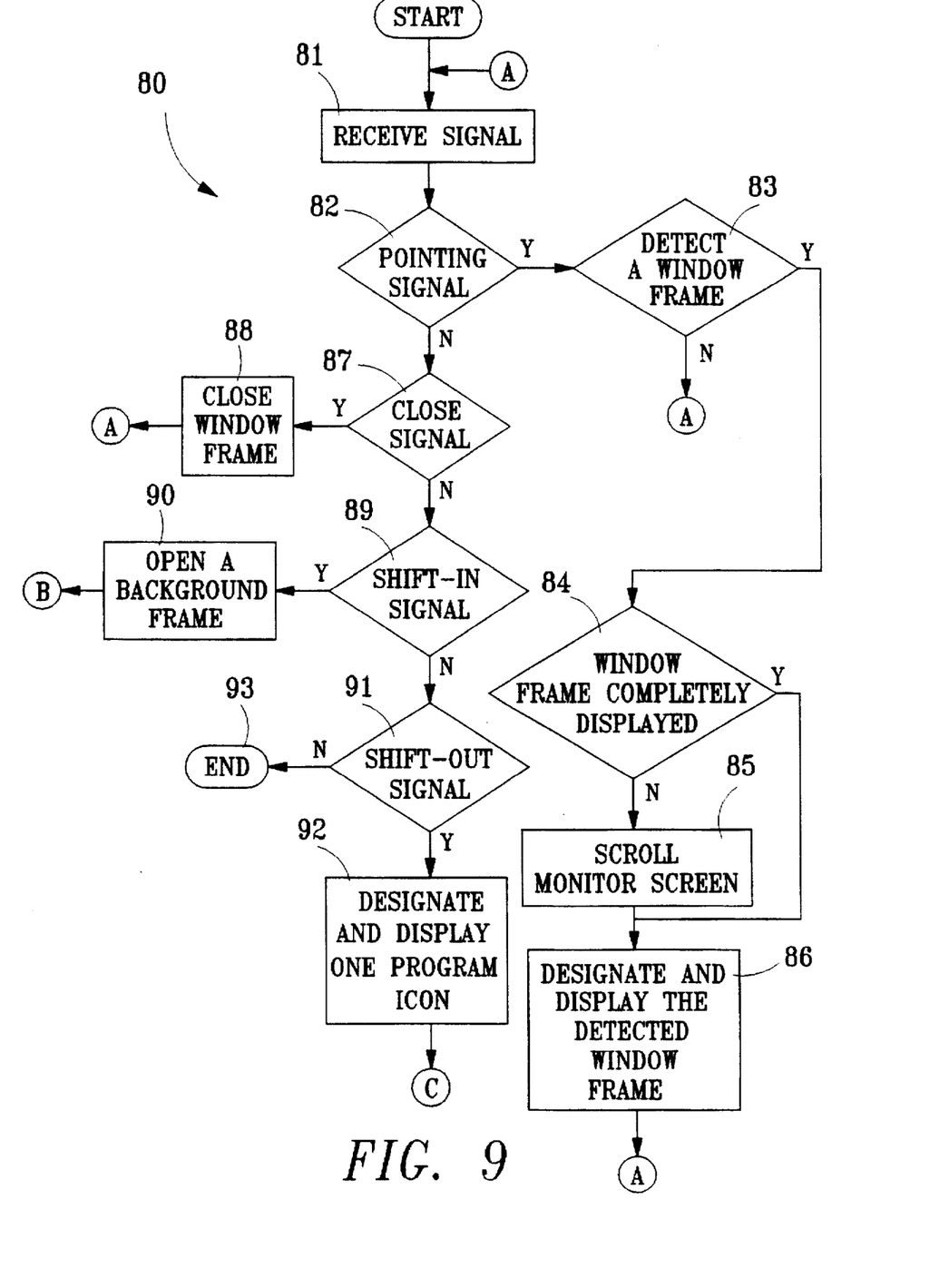
FIG. 9 shows a window frame pointing process used by the frame control module for pointing or closing an opened window frame.

FIG. 9 shows a window frame pointing process 80 used by the frame control module 56 for pointing or closing an opened window frame within a plurality of window frames contained in a window interface. One of the window frames displayed over the monitor screen is designated and displayed as a pointed window frame. The pointing signal generated by the control button 24 of the mouse 10 is used to point or select another window frame. The pointing signal is generated by using the mouse 10 by pressing the control button 24 toward one intended direction. And the shift-in or shift-out signal is generated by pressing the front end 20 or rear end 22 of the bi-directional button 18. These signals will be processed by the frame control module 56 according to the following steps.

step 81 receive an input signal from the mouse 10;
step 82 determine if the input signal is a pointing signal; if not, go to step 87;
step 83 detect a position of a window frame contained in the frame position file starting from the position of the pointed window frame approximately along the direction of the pointing signal; go to step 81 if not detected;
step 84 determine if the detected window frame is completely displayed; go to step 86 if yes;
step 85 scroll the content of the monitor screen 45 first so that the detected window frame can be completely displayed;
step 86 designate and display the detected window frame as a pointed window frame over the monitor screen 45 and display the last pointed window frame in a normal manner; go to step 81;
step 87 determine if the input signal is a close signal; if not, go to step 89;
step 88 close the pointed window frame by removing it from the monitor screen 45 and record the information about the closed window frame in the background file; designate and display another displayed window frame as a pointed window frame over the monitor screen 45; go to step 81;
step 89 determine if the input signal is a shift-in signal; if not, go to step 91;
step 90 open a background frame over the monitor screen 45 which contains frame icons representing the closed window frames recorded in the background file; display the last pointed window frame in a normal manner; exit and go to the background frame process 100;
step 91 determine if the input signal is a shift-out signal; if not, go to step 93;
step 92 designate and display one of the program icons of the pointed window frame as a pointed program icon over the monitor screen 45 and display the last pointed window frame in a normal manner; exit and go to the icon pointing process 120;

step 93 terminate the process.

If the input signal is not a pointing signal, a close signal, a shift-in or shift-out signal, the frame control module 56 will terminate the process 80 and select other process to handle it.

Figure 10:
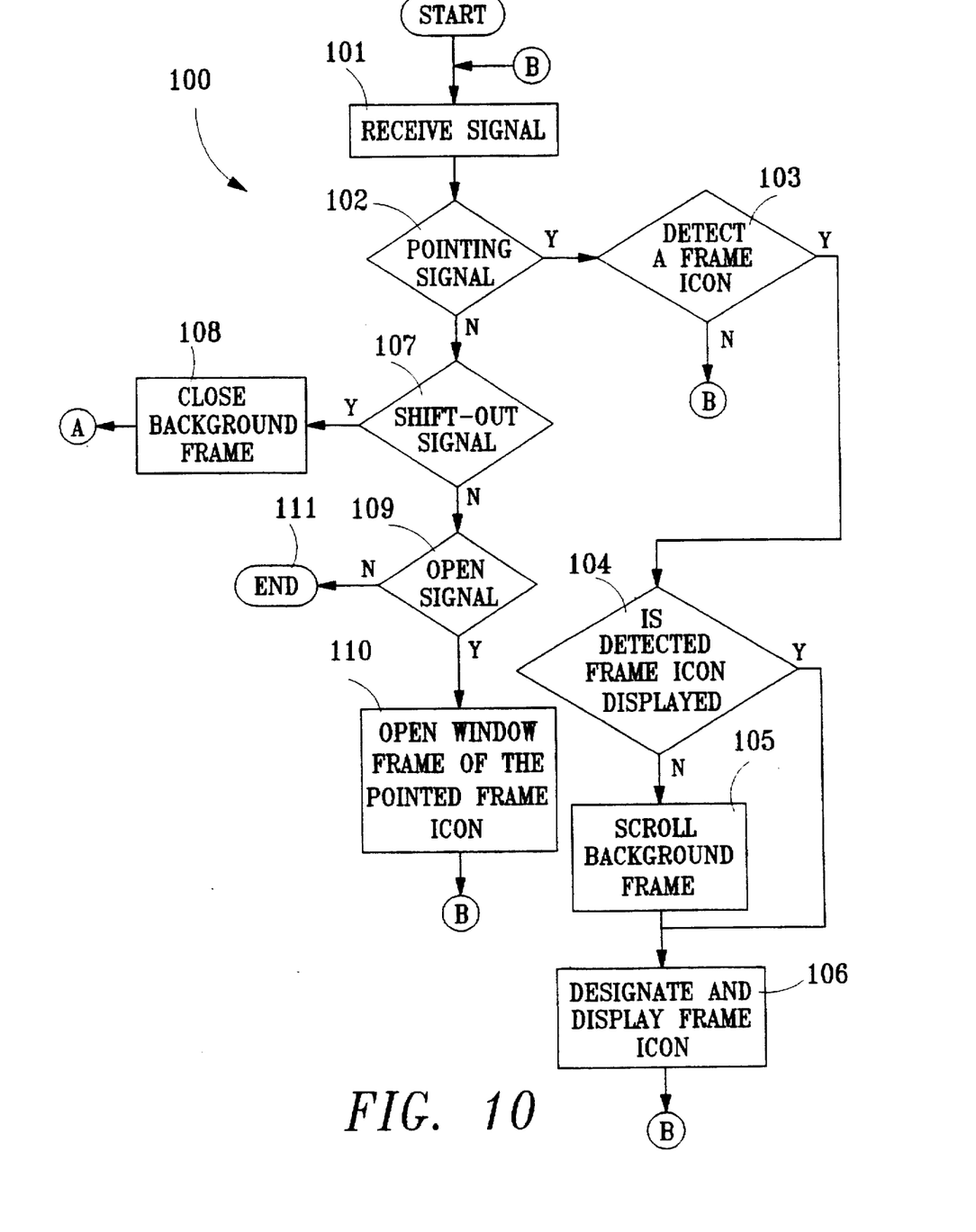
FIG. 10 shows a background frame pointing process used by the frame control module for pointing or opening a closed window frame.

FIG. 10 shows a background frame pointing process 100 used by the frame control module 56 for pointing or opening a closed window frame within a plurality of window frames contained in a background frame which contains frame icons representing the closed window frames recorded in the background file. The positions of all the frame icons contained within the background frame are stored in an icon position file (not shown) of the window software 54. Each frame icon is approximately in a rectangular shape and the position of each frame icon is defined as the center of each frame icon so that only one position is needed for each frame icon in the icon position file. Again, one of the frame icons displayed in the background frame is designated and displayed as a pointed frame icon, and the other frame icons are displayed in a normal manner. The pointing signal generated by the control button 24 of the mouse 10 is used to point or select another frame icon. The shift-out signal is used to close the background frame and shift the control of the frame control module 56 back to the window frame pointing process 80. These signals will be processed by the frame control module 56 according to the following steps.

step 101 receive an input signal from the mouse 10;

step 102 determine if the input signal is a pointing signal; if not, go to step 107;

step 103 detect a position of a frame icon contained in the icon position file of the background frame starting from the position of the pointed frame icon approximately along the direction of the pointing signal; go to step 101 if not detected;

step 104 determine if the detected frame icon is displayed; go to step 106 if yes;

step 105 scroll the content of the background frame first so that the detected frame icon can be displayed;

step 106 designate and display the detected frame icon as a pointed frame icon over the monitor screen 45 and display the last pointed frame icon in a normal manner; go to step 101;

step 107 determine if the input signal is a shift-out signal; if not, go to step 109;

step 108 close the background frame by removing it from the monitor screen 45, designate and display the last opened window frame or the last pointed window frame of the window interface 62 as a pointed window frame over the monitor screen 45; exit and go to the window frame pointing process 80;

step 109 determine if the input signal is an open signal; if not, go to step 111;

step 110 open the window frame of the pointed frame icon:
  (1) locate a position in the window interface 62 displayed over the monitor screen 45;
  (2) display the window frame of the pointed frame icon over the located position of the monitor screen 45;
  (3) remove the pointed frame icon from the background frame;
  (4) remove the recorded information of the opened window frame from the background file; and
  (5) designate and display another displayed frame icon as a pointed frame icon; go to step 101;

step 111 terminate the process.

If the input signal is not a pointing signal, a shift-out signal, or an open signal, the frame control module 56 will terminate the process 100 and select other process to handle it.

Figure 11:
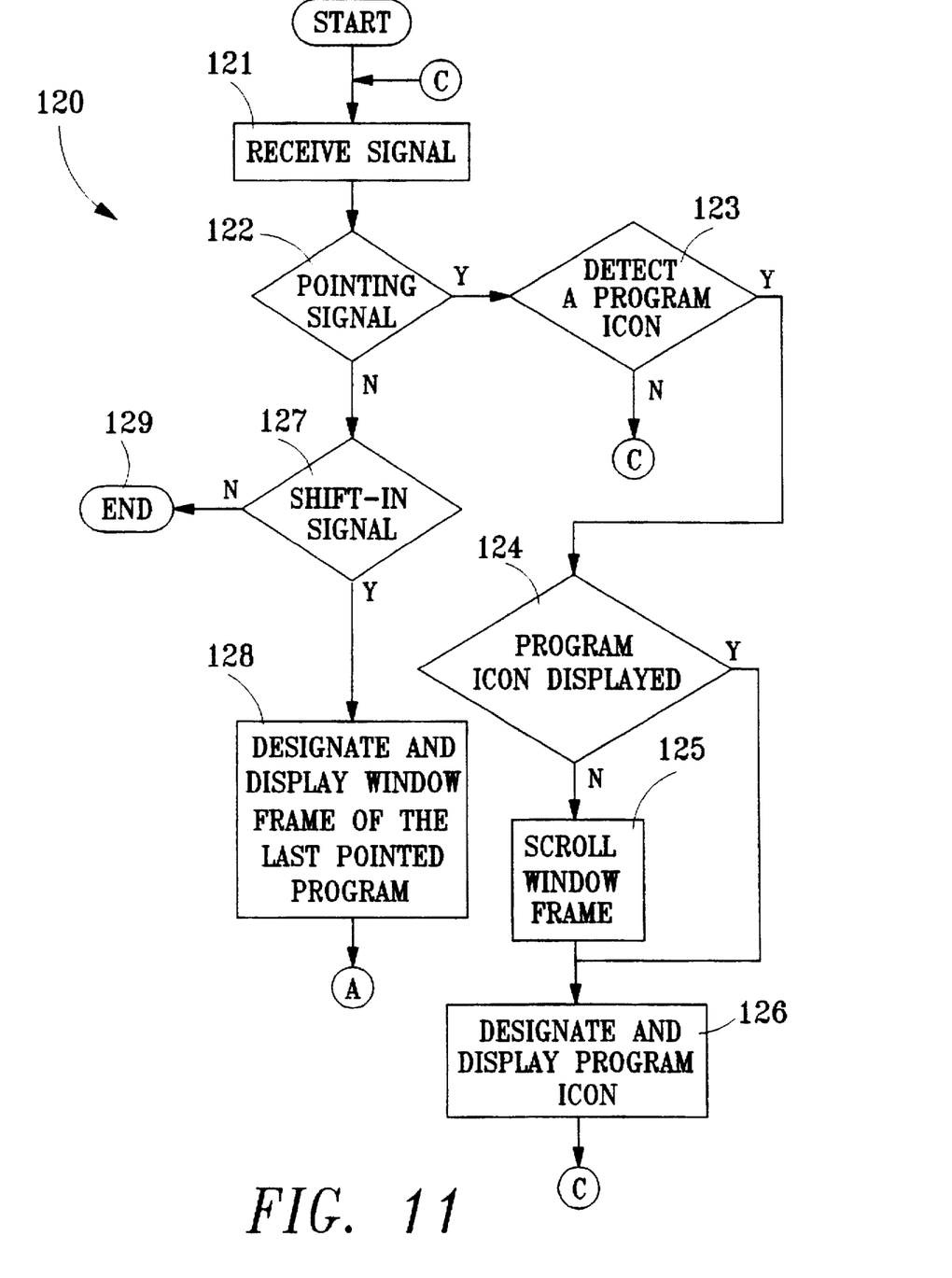
FIG. 11 shows a program icon pointing process used by the frame control module for pointing a program icon.

FIG. 11 shows a program icon pointing process 120 used by the frame control module 56 for pointing a program icon within a plurality of program icons contained within the pointed window frame. The positions of all the program icons contained within the window frame are stored in an icon position file (not shown) of the window software. Each program icon is approximately in a rectangular shape and the position of each program icon is defined as the center of each icon so that only one position is needed for each icon in the icon position file. When the control of the frame control module 56 is shifted into the process 120, one of the program icons displayed in the window frame is designated and displayed as a pointed program icon and the window frame of the pointed frame icon is displayed in a normal manner. The pointing signal generated by the control button 24 of the mouse 10 is used to point or select another program icon. The shift-in signal is used to shift the control of the frame control module 56 back to the window frame pointing process 80. These signals will be processed by the frame control module 56 according to the following steps.

step 121 receive an input signal from the mouse 10;

step 122 determine if the input signal is a pointing signal; if not, go to step 127;

step 123 detect a position of a program icon contained in the icon position file of the window frame starting from the position of the pointed program icon approximately along the direction of the pointing signal; go to step 121 if not detected;

step 124 determine if the detected program icon is displayed; go to step 126 if yes;

step 125 scroll the content of the window frame first so that the detected program icon can be displayed;

step 126 designate and display the detected program icon as a pointed program icon over the monitor screen 45 and display the last pointed program icon in a normal manner; go to step 121;

step 127 determine if the input signal is a shift-in signal; if not, go to step 129;

step 128 designate and display the window frame of the last pointed program icon as a pointed window frame over the monitor screen 45 and display the last pointed program icon in a normal manner; exit and go to the window frame pointing process 80;

step 129 terminate the process.

If the input signal is not a pointing signal or a shift-in signal, the frame control module 56 will terminate the process 120 and select other process to handle it.

Figure 12:
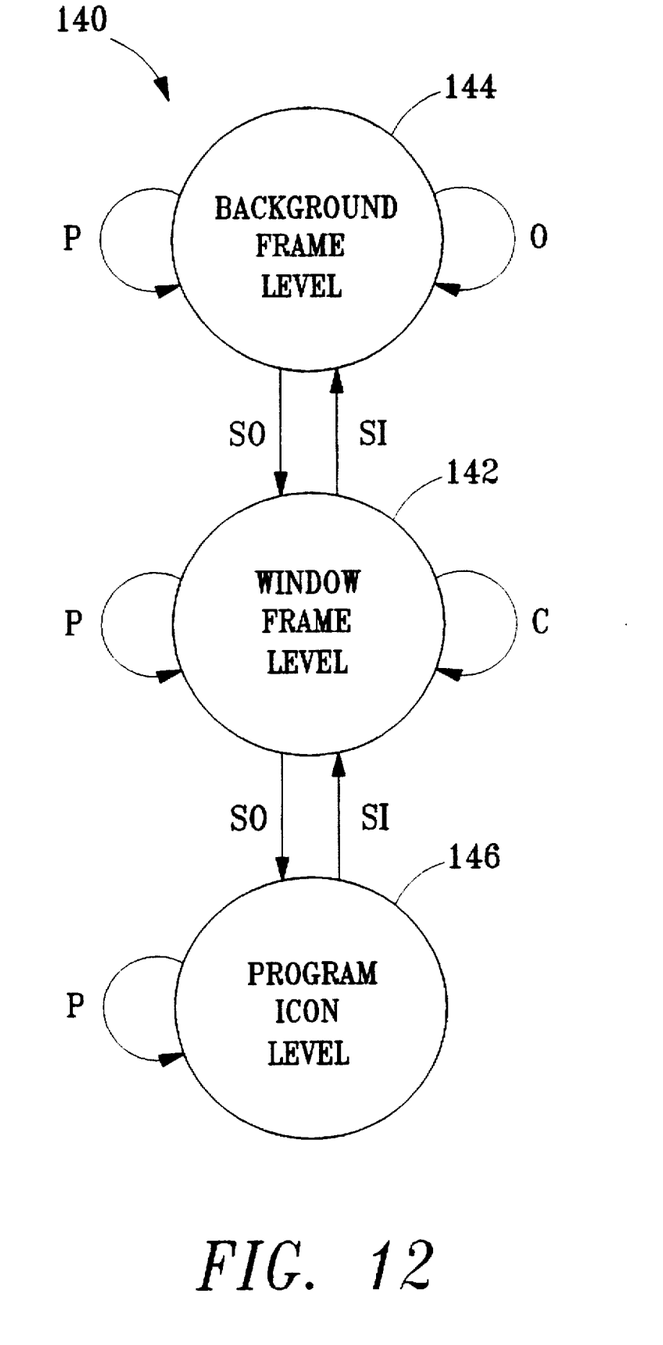
FIG. 12 shows a state machine which illustrates how is the control of the frame control module shifted between a window frame level, a background frame level and program icon level by the shift-in and shift-out signals.

FIG. 12 shows a state machine 140 which illustrates how is the control of the frame control module 56 shifted between a window frame level 142, a background frame level and a program icon level 146 by the shift-in and shift-out signals, pointing signals, and open and close signals. Each of these levels are related to the processes 80, 100 and 120 described above. The window frame level 142 is related to the window frame pointing process 80, the background frame level 144 is related to the background frame process 100 and the program icon level 146 is related to the program icon pointing process 120. When the control of the frame control module 56 is shifted to any of the three levels, the related process of that level will be executed by the frame control module 56.

In the preferred embodiment, the pointing signal and the open or close signal will not change the state of the frame control module 56 in any of the three levels, but the shift-in and shift-out signals will. When the window interface 62 is initially displayed over the monitor screen 45, the frame control module 56 is in the window frame level 142 and one of the window frames is pointed as a pointed window frame. When a shift-in signal is received, the state of the frame control module 56 is shifted to the background frame level 144 and a frame icon will be designated and displayed as a pointed frame icon while the last pointed window frame will be reset to a normal status. Within the background frame level 144, if a shift-out signal is received by the frame control module 56, the state of the frame control module 56 is shifted back to the window frame level 142 and a window frame will be designated and displayed as a pointed window frame again while the background frame will be removed from the monitor screen 45. The program icon level 146 can be shifted from the window frame level 142 by using a shift-out signal and shifted back to the window frame level 142 by using a shift-in signal.

Such design allows a user to change the level of the frame control module 56 directly by pressing the front end 20 or the rear end 22 of the bi-directional button 18 only. Once an intended level is reached, the user can then use the control button 24 to point a target icon or frame directly. And once a target icon or frame is reached, the user can easily perform any function to the icon or frame in traditional manner. Such design greatly simplifies the interactive processes of a traditional window interface.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for pointing a window frame out of a plurality of window frames contained within a window interface by using a pointing device, the window interface being displayed over a monitor screen of a monitor, one of the window frames being designated as a pointed window frame which is displayed over the monitor screen in a predetermined manner, and the other window frames displayed over the monitor screen being displayed in a normal manner, the pointing device comprising a two dimensional control button for generating a two dimensional pointing signal, and a cursor control means for generating cursor control signals to scroll a cursor displayed over the monitor screen according to user inputs, the pointing device being connected to a computer which is connected to the monitor and which comprises a window software for controlling the window frames and the cursor, the window software comprising a frame control module for controlling the pointing of a window frame according to the pointing signal and a cursor control module for controlling the scrolling of the cursor over the monitor screen according to the cursor control signals, the method comprising:

a. providing a frame position file which contains positions representing the window frames contained within the window interface;

b. actuating the control button toward a direction by a user to generate a pointing signal;

c. receiving the pointing signal by using the frame control module;

d. detecting a position of a window frame contained in the frame position file starting from the position of the pointed window frame approximately along the direction of the pointing signal; and e. designating and displaying the detected window frame as a pointed window frame over the monitor screen.

2. The method of claim 1 wherein some of the window frames contained in the window interface are displayed over the monitor screen and wherein if the detected window frame is not displayed over the monitor screen, the frame control module will scroll the content of the monitor screen first so that the detected window frame can be displayed over the monitor screen.

3. The method of claim 1 wherein some of the window frames contained in the window interface are partially displayed over the monitor screen and wherein if the detected window frame is one of the partially displayed window frames, the frame control module will scroll the content of the monitor screen first to completely display the detected window frame over the monitor screen.

4. The method of claim 1 wherein each window frame is positioned within the window interface which is represented by a two dimensional rectangular area and wherein the position of each window frame contained in the frame position file represents the window frame's position within the rectangular area.

5. The method of claim 1 wherein each of the window frames can further be closed or opened by using the pointing device.

6. The method of claim 5 wherein the pointing device comprises a bi-directional button having a first end for generating a close signal to close the pointed window frame.

7. The method of claim 5 wherein the frame position file contains positions of all the opened window frames.

8. The method of claim 7 wherein the window software further comprises a background file for keeping information of all the closed window frames, and wherein when an opened window frame is closed by using the pointing device, the window frame is removed from the window interface and the information about the closed window frame is recorded in the background file by the frame control module.

9. The method of claim 8 wherein when a closed window frame recorded in the background file is opened by using the pointing device, the window frame is moved into the window interface by the frame control module.

10. The method of claim 8 wherein the pointing device comprises a hi-directional button having a first end for generating a shift-in signal and a second end for generating a shift-out signal for controlling the frame control module.

11. The method of claim 10 wherein the frame control module, upon receiving the shift-in signal when one of the window frames is being pointed, opens a background frame over the monitor screen which contains frame icons representing the closed window frames recorded in the background file.

12. The method of claim 11 wherein the frame control module closes the background frame upon receiving the shift-out signal.

13. The method of claim 10 wherein each of the window frames contains a plurality of program icons and each of the program icons represents an executable program stored in the computer.

14. The method of claim 13 wherein the frame control module, upon receiving the shift-out signal when one of the window frames is being pointed, designates and displays one of the program icons of the last pointed window frame as a pointed icon.

15. The method of claim 14 wherein the frame control module, upon receiving the shift-in signal when one of the program icons is being pointed, designates and displays the window frame of the last pointed icon as a pointed window frame.

16. A method for pointing a program icon out of a plurality of program icons contained within a window frame by using a pointing device, the window frame being displayed over a monitor screen of a monitor, one of the program icons being designated as a pointed icon which is displayed over the monitor screen in a predetermined manner, and the other program icons displayed over the monitor screen being displayed in a normal manner, the pointing device comprising a two dimensional control button for generating a two dimensional pointing signal, and a cursor control means for generating cursor control signals to scroll a cursor displayed over the monitor screen according to user inputs, the pointing device being connected to a computer which is connected to the monitor and which comprises a window software for controlling the window frame, the program icons and the cursor, the window software comprising a frame control module for controlling the pointing of a program icon according to the pointing signal and a cursor control module for controlling the scrolling of the cursor over the monitor screen according to the cursor control signals, the method comprising:

a. providing an icon position file which contains positions representing the program icons contained within the window frame;

b. actuating the control button toward a direction by a user to generate a pointing signal;

c. receiving the pointing signal by using the frame control module;

d. detecting a position of a program icon contained in the icon position file starting from the position of the pointed icon approximately along the direction of the pointing signal; and e. designating and displaying the detected program icon as a pointed icon over the monitor screen.

17. The method of claim 16 wherein part of the program icons contained in the window frame are displayed over the monitor screen and wherein if the detected program icon is not displayed over the monitor screen, the frame control module will scroll the content of the window frame first to display the detected program icon in the monitor screen.

18. The method of claim 16 wherein each program icon is positioned within the window frame which is represented by a two dimensional rectangular area and wherein the position of each program icon contained in the icon position file represents the program icon's position within the rectangular area.

19. The method of claim 16 wherein the pointing device comprises a bi-directional button having a first end for generating a shift-in signal and a second end for generating a shift-out signal, and wherein the frame control module, upon receiving the shift-out signal when one of the program icons is being pointed, designates and displays the window frame of the last pointed icon as a pointed window frame.

20. The method of claim 19 wherein the frame control module, upon receiving the shift-in signal when the window frame is being pointed, designates and displays one of the program icons of the window frame as a pointed icon.

* * * * *